United States Patent
Arnett et al.

(10) Patent No.: US 10,749,254 B2
(45) Date of Patent: Aug. 18, 2020

(54) SIDEBAND-BASED SELF-CALIBRATION OF AN ARRAY ANTENNA SYSTEM

(71) Applicant: QUALCOMM Incorporated, San Diego, CA (US)

(72) Inventors: Andrew Arnett, San Diego, CA (US); Dai Lu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/544,641

(22) Filed: Aug. 19, 2019

(65) Prior Publication Data

US 2020/0067184 A1 Feb. 27, 2020

Related U.S. Application Data

(60) Provisional application No. 62/720,655, filed on Aug. 21, 2018.

(51) Int. Cl.
| | | |
|---|---|---|
| *H04B 17/00* | (2015.01) | |
| *H01Q 3/26* | (2006.01) | |
| *H04B 17/21* | (2015.01) | |
| *H04B 17/11* | (2015.01) | |
| *H04B 1/40* | (2015.01) | |

(52) U.S. Cl.
CPC ............ *H01Q 3/2605* (2013.01); *H04B 1/40* (2013.01); *H04B 17/11* (2015.01); *H04B 17/21* (2015.01)

(58) Field of Classification Search
CPC ...... H01Q 3/2605; H04B 17/11; H04B 17/21; H04B 1/40
USPC ............. 455/67.11, 67.14, 115.1, 115.2
See application file for complete search history.

(56) References Cited

U.S. PATENT DOCUMENTS

| | | | | |
|---|---|---|---|---|
| 9,490,548 | B2 * | 11/2016 | Weissman | H01Q 3/26 |
| 10,454,596 | B2 * | 10/2019 | Mow | H04B 17/14 |
| 2010/0321233 | A1 * | 12/2010 | Ben-Zur | H01Q 3/267 |
| | | | | 342/174 |
| 2012/0064849 | A1 * | 3/2012 | Langer | H03F 3/24 |
| | | | | 455/127.2 |
| 2015/0061761 | A1 * | 3/2015 | Wills | H03F 1/0222 |
| | | | | 330/127 |
| 2015/0139352 | A1 | 5/2015 | Matsuo et al. | |

FOREIGN PATENT DOCUMENTS

| | | |
|---|---|---|
| WO | WO-2014148958 A1 | 9/2014 |
| WO | WO-2017201765 A1 | 11/2017 |

OTHER PUBLICATIONS

International Search Report and Written Opinion—PCT/US2019/047290—ISA/EPO—dated Nov. 8, 2019.

* cited by examiner

*Primary Examiner* — Sonny Trinh
(74) *Attorney, Agent, or Firm* — Holland & Hart LLP/Qualcomm

(57) ABSTRACT

Methods, systems, and devices are described for calibration of an array antenna system. A device may transmit a calibration signal from a first antenna element of an antenna array. The calibration signal may be generated by modulating a first signal having a first frequency with a modulation signal having a second frequency. The device may receive the calibration signal using a second antenna element of the antenna array. The device may analyze a sideband of the received calibration signal, where the sideband may be offset in frequency from the first frequency by the second frequency. The device may calibrate the array antenna system based on or more measured properties of the sideband.

29 Claims, 7 Drawing Sheets

SIDEBAND-BASED SELF-CALIBRATION OF AN ARRAY ANTENNA SYSTEM

CROSS REFERENCE

The present Application for Patent claims the benefit of U.S. Provisional Patent Application No. 62/720,655 by Arnett et al., entitled "SIDEBAND-BASED SELF-CALIBRATION OF AN ANTENNA ARRAY," filed Aug. 21, 2018, which is assigned to the assignee hereof and expressly incorporated by reference in its entirety.

BACKGROUND

The following relates generally to wireless communications, and more specifically to sideband-based self-calibration of an array antenna system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (OFDM) (DFT-s-OFDM). A wireless multiple-access communications system may include a number of base stations or network access nodes, each simultaneously supporting communication for multiple communication devices, which may be otherwise known as user equipment (UE).

Some wireless communications systems, such as NR systems, may use high-frequency signals and an array of antenna elements to form directional communication links, and may communicate data via the directional communications link. For example, a phased array antenna system (e.g., a communications system that may process, transmit, and receive signals via a phased array antenna) may be configured to generate and steer (point) the directional communication links in different directions by manipulating phase and/or amplitude relationships between signals transmitted and received by the individual antenna elements of the phased array antenna. For example, the phased array antenna system may be configured to point one or more beams at a target during operation. The constituent antenna elements of the phased array antenna are typically closely packed, and the small distance between the antenna elements has the potential to affect not only their radiation pattern, but may also contribute to mutual coupling between them, which may increase interference and/or degrade performance.

SUMMARY

The described techniques relate to improved methods, systems, devices, and apparatuses that support sideband-based self-calibration of an array antenna system (e.g., a system, which may include one or more devices, configured to communicate using an array antenna, such as a phased array antenna). The system may transmit a calibration signal via a first antenna element of an antenna array, where the calibration signal may include a first signal at a first frequency and that is modulated by a second signal at a second frequency. The first signal may be, for example, an unmodulated signal, and the second signal may be, for example, a modulation signal. The system may receive the calibration signal (as transmitted via the first antenna element) via a second antenna element of the antenna array.

The system may analyze a sideband of the received calibration signal (e.g., to determine an amplitude, phase, or other characteristic (parameter, metric) of the sideband). The sideband may be offset in frequency from a center frequency of the calibration signal by, for example, the frequency of the modulation signal. The system may determine, based on the sideband, a path loss, phase shift, or other characteristic of a signal path between the first antenna element and the second antenna element, where the signal path includes mutual coupling between the first antenna element and the second antenna element of the antenna array. The system may calibrate the antenna system accordingly (e.g., by adjusting phase and/or amplitude offsets for signals transmitted and received by one or more individual antenna elements of the phased array antenna).

An antenna system is described. The antenna system may include an amplifier configured to receive a first signal having a first frequency and output a calibration signal based on the first signal, a modulator configured to modulate the calibration signal based on a second signal having a second frequency, where modulating the calibration signal includes modulating a voltage supply for the amplifier, a first antenna element of an array of antenna elements, where the first antenna element is coupled with the amplifier and is configured to transmit the calibration signal, and a second antenna element of the array of antenna elements, where the second antenna element is configured to receive the calibration signal from the first antenna element.

Some examples of the antenna system described herein may further include control circuitry coupled with the second antenna element, where the control circuitry is configured to determine an amplitude of a sideband of the received calibration signal, and where the sideband has a third frequency that is offset from the first frequency by the second frequency, and to calibrate the antenna system based on the determined amplitude of the sideband. Some examples of the antenna system described herein may further include a phase shifter coupled with the first antenna element, where the control circuitry is configured to calibrate the antenna system based at least in part on calibrating the phase shifter.

In some examples of the antenna system described herein, the control circuitry is further configured to determine, based on the determined amplitude of the sideband, a path loss for a signal path between the first antenna element and the second antenna element, where the calibrating is based at least in part on the determined path loss. In some examples of the antenna system described herein, the control circuitry is further configured to determine an amplitude of a second sideband of the received calibration signal, where the second sideband has a fourth frequency, and where the first frequency is between the third frequency and the fourth frequency, and to calibrate the antenna system based on the determined amplitude of the second sideband.

In some examples of the antenna system described herein, the the second signal is independent of the first signal.

Some examples of the antenna system described herein may further include envelope tracking circuitry coupled with the voltage supply, where the modulator is configured to modulate the voltage supply for the amplifier based on being coupled with the envelope tracking circuitry.

Some examples of the antenna system described herein may further include a digital-to-analog converter (DAC) coupled with the voltage supply, where a voltage of the voltage supply is based on an analog signal output by the DAC, the analog signal output by the DAC is based on an input signal for the DAC, and the modulator is configured to modulate the voltage supply for the amplifier based on modulating the input signal for the DAC. Some examples of the antenna system described herein may further include envelope tracking circuitry that includes the DAC and envelope tracking logic.

Some examples of the antenna system described herein may further include a second amplifier coupled with the amplifier, where the second amplifier is configured to receive an input signal and output the first signal based at least in part on amplifying the input signal.

Some examples of the antenna system described herein may further include a switching network configured to selectively couple the modulator with the amplifier or with a third amplifier, where the third amplifier is coupled with a third antenna element of the array of antenna elements.

In some examples of the antenna system described herein, the amplifier is a power amplifier. In some examples of the antenna system described herein, the amplifier is coupled with the first antenna element via a signal path that lacks additional amplification. In some examples of the antenna system described herein, the amplifier is coupled with the first antenna element via an ohmic signal path.

A method of wireless communications is described. The method may include transmitting, at a first antenna element of an antenna array, a calibration signal that includes a first signal having a first frequency and that is modulated by a second signal having a second frequency, receiving the calibration signal at a second antenna element of the antenna array, analyzing a sideband of the received calibration signal, where the sideband has a third frequency that is offset from the first frequency by the second frequency, determining, based on analyzing the sideband, a path loss for a signal path that includes mutual coupling between the first antenna element of the antenna array and the second antenna element of the antenna array, and calibrating a system that includes the antenna array based on the determined path loss.

An apparatus for wireless communications is described. The apparatus may include a processor, memory coupled with the processor, and instructions stored in the memory. The instructions may be executable by the processor to cause the apparatus to transmit, at a first antenna element of an antenna array, a calibration signal that includes a first signal having a first frequency and that is modulated by a second signal having a second frequency, receive the calibration signal at a second antenna element of the antenna array, analyze a sideband of the received calibration signal, where the sideband has a third frequency that is offset from the first frequency by the second frequency, determine, based on analyzing the sideband, a path loss for a signal path that includes mutual coupling between the first antenna element of the antenna array and the second antenna element of the antenna array, and calibrate a system that includes the antenna array based on the determined path loss.

Another apparatus for wireless communications is described. The apparatus may include means for transmitting, at a first antenna element of an antenna array, a calibration signal that includes a first signal having a first frequency and that is modulated by a second signal having a second frequency, receiving the calibration signal at a second antenna element of the antenna array, analyzing a sideband of the received calibration signal, where the sideband has a third frequency that is offset from the first frequency by the second frequency, determining, based on analyzing the sideband, a path loss for a signal path that includes mutual coupling between the first antenna element of the antenna array and the second antenna element of the antenna array, and calibrating a system that includes the antenna array based on the determined path loss.

A non-transitory computer-readable medium storing code for wireless communications is described. The code may include instructions executable by a processor to transmit, at a first antenna element of an antenna array, a calibration signal that includes a first signal having a first frequency and that is modulated by a second signal having a second frequency, receive the calibration signal at a second antenna element of the antenna array, analyze a sideband of the received calibration signal, where the sideband has a third frequency that is offset from the first frequency by the second frequency, determine, based on analyzing the sideband, a path loss for a signal path that includes mutual coupling between the first antenna element of the antenna array and the second antenna element of the antenna array, and calibrate a system that includes the antenna array based on the determined path loss.

Some examples of the method, apparatuses, and non-transitory computer-readable medium described herein may further include operations, features, means, or instructions for introducing the first signal at a first point of a transmit chain for the first antenna element, and introducing the second signal at a second point of the transmit chain for the first antenna element.

In some examples of the method, apparatuses, and non-transitory computer-readable medium described herein, the second point of the transmit chain may be nearer the first antenna element than the first point of the transmit chain. In some examples of the method, apparatuses, and non-transitory computer-readable medium described herein, the first point of the transmit chain may be coupled with the first antenna element via a first signal path, and the second point of the transmit chain may be coupled with the first antenna element via a second signal path that may be a subset of the first signal path.

In some examples of the method, apparatuses, and non-transitory computer-readable medium described herein, introducing the second signal at the second point of the transmit chain may include operations, features, means, or instructions for introducing the second signal via an amplifier included in the transmit chain. In some examples of the method, apparatuses, and non-transitory computer-readable medium described herein, introducing the second signal via the amplifier may include operations, features, means, or instructions for modulating a supply voltage of the amplifier based on the second signal.

In some examples of the method, apparatuses, and non-transitory computer-readable medium described herein, the amplifier may be a power amplifier that may be coupled with the first antenna element via a signal path that lacks additional power amplification. In some examples of the method, apparatuses, and non-transitory computer-readable medium described herein, the amplifier may be coupled with the first antenna element via an ohmic signal path.

Some examples of the method, apparatuses, and non-transitory computer-readable medium described herein may further include operations, features, means, or instructions for analyzing a second sideband of the received calibration signal, where the second sideband may have a fourth frequency, where the first frequency may be between the third frequency and the fourth frequency, and where determining the path loss may be based on analyzing the second sideband. In some examples of the method, apparatuses, and non-transitory computer-readable medium described herein, the fourth frequency may be offset from the first frequency by the second frequency.

Some examples of the method, apparatuses, and non-transitory computer-readable medium described herein may further include operations, features, means, or instructions for modulating at least one of an amplitude, phase, or frequency of the second signal. In some examples of the method, apparatuses, and non-transitory computer-readable medium described herein, analyzing the sideband may include operations, features, means, or instructions for determining an amplitude of the received calibration signal at the third frequency.

In some examples of the method, apparatuses, and non-transitory computer-readable medium described herein, analyzing the sideband may include operations, features, means, or instructions for determining a phase of the received calibration signal at the third frequency. In some examples of the method, apparatuses, and non-transitory computer-readable medium described herein, calibrating the system that includes the antenna array may include operations, features, means, or instructions for calibrating at least one of a first phase shifter coupled with the first antenna element or a second phase shifter coupled with the second antenna element.

DETAILED DESCRIPTION

Figure 1:
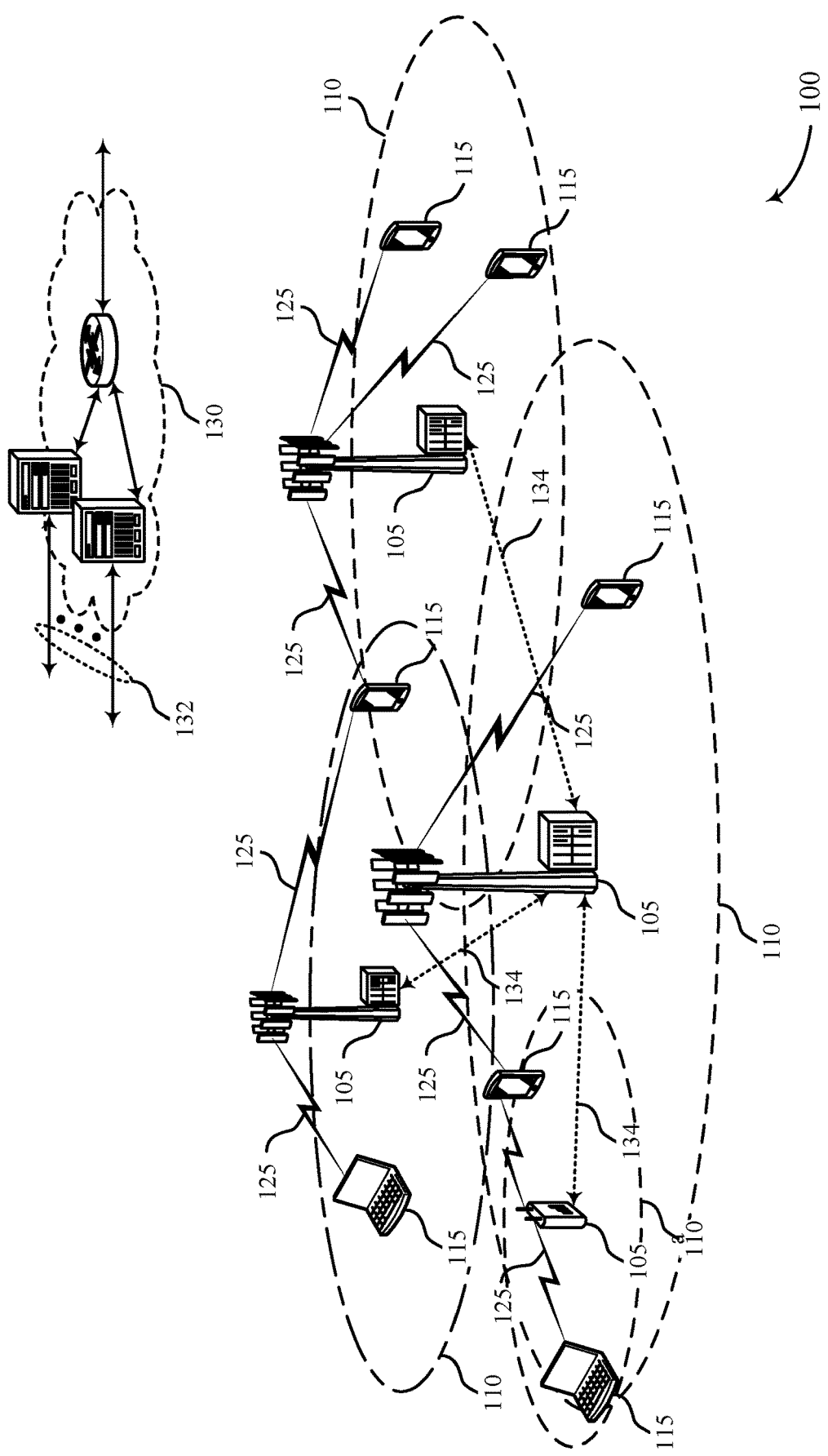
FIG. 1 illustrates an example of a wireless communications system in accordance with aspects of the present disclosure.

The described features generally relate to a techniques for sideband-based self-calibration of an array antenna system (e.g., a system, which may include one or more devices, configured to communicate using an array antenna, such as a phased array antenna). Some wireless communications systems, such as New Radio (NR) systems, may use millimeter waves (e.g., high-frequency signals) to form directional communication links (e.g., beams) used to communicate data. A phased array antenna system may be configured to generate the directional communication links in different directions by manipulating phase and/or amplitude relationships between the respective signals transmitted and received by the individual antenna elements of the phased array antenna. For example, the phased array antenna system may be configured to point one or more beams at a target during operation.

In some cases, mutual coupling between different individual antenna elements of the phased array antenna may increase interference and/or degrade performance of the antenna system. For example, mutual coupling with another antenna element may create an offset in the phase and/or amplitude of signals as transmitted or received by an antenna element or may otherwise degrade beam quality. A phased array antenna system may be calibrated to account for such mutual coupling. For example, a codebook may specify, for each of a set of beam directions, a corresponding set of desired (target, ideal) phase and/or amplitude offsets (e.g., phase shifts or delays) for signals respectively transmitted or received by individual antenna elements of the phased array antenna, which may be referred to as the codebook offsets. Calibrating the phased array antenna system may include determining an additional set of respective phase and/or amplitude offsets, which may be referred to as calibration offsets and which may be combined with the codebook offsets (e.g., to increase or decrease a total amount of phase and/or amplitude offset associated with signals transmitted or received by an individual antenna element) to account for (e.g., negate) mutual coupling or other non-idealities associated with the individual antenna elements. If the signals sent via different antenna elements are calibrated (adjusted) based on the codebook offsets as well as (e.g., combined with, as adjusted, compensated, or calibrated by) the calibration offsets, then signals as-transmitted or as-received via the antenna elements may more closely align with the codebook offsets.

Thus, calibrating an array antenna system may include determining corresponding calibration offsets along with adjusting the phase of signals sent and received by individual antenna elements, either statically or dynamically, based on the calibration offsets. In some cases, aspects of transmit and receive chain circuitry for the individual antenna elements (e.g., phase shifters included in the transmit and receive chains) may be adjusted based on the calibration offsets. A transmit chain or a receive chain may respectively refer to a set of circuitry and/or other components configured to receive an input signal via a wired interface and output a corresponding over-the-air signal via an antenna element or to receive an over-the-air signal via the antenna element and provide a corresponding output signal via the wired interface. In some cases, the antenna element may be considered part of the transmit chain or the receive chain. In some cases, calibration offsets may be utilized by altering the phases and/or amplitudes with which signals are generated for transmission, or accounting for the calibration offsets when processing received signals.

In some cases, a phased array antenna system may perform a self-calibration procedure. For example, the phased array antenna system may transmit and receive via the phased array antenna a sequence of calibration signals to calibrate itself (e.g., determination calibration offsets and calibrate its phase shifters accordingly) without the use of a further external device. Some self-calibration techniques may utilize some mutual coupling between the antenna elements of the phased array antenna for calibration, but may be corrupted by, obscured by (e.g., drowned out by), or otherwise fail to properly utilize the impact of mutual coupling between antenna elements and transmit and receive chains other than over-the-air mutual coupling, which may be referred to as blow-by. For example, blow-by may include parasitic cross-coupling (e.g., capacitive crosstalk) between various components of the phased array antenna system at points of transmit or receive chains other than the antenna elements.

Techniques are described herein for an array antenna system to self-calibrate using sidebands of a calibration signal, which may better isolate the impact of over-the-air mutual coupling between antenna elements of an array antenna while mitigating the impact of blow-by at other points within the array antenna system. In some cases, a modulation signal having a second frequency may be added to a calibration signal having a center frequency at a first frequency—giving rise to sideband signals offset from the center frequency by plus or minus the second (modulation signal) frequency—and self-calibration may be based on at least one sideband. That is, self-calibration may be based on a signal having a third frequency equal to the first frequency plus or minus the second frequency (e.g., rather than on the center frequency of the calibration signal, which may be the first frequency). For example, the modulation signal may be added to the calibration signal near the antenna elements, and thus after some or all sources of potential blow-by. The calibration signal, with the modulation signal injected into it, may then be transmitted at one antenna element of the array and received at another. The received signal may then be analyzed (e.g., by a digital signal processor (DSP) or other control circuitry) to determine an attenuation, phase offset, or other relationship between the transmitted and received signals at the sideband frequency.

Because the control circuitry may be aware of the modulation signal frequency and the calibration signal frequency, the control circuitry may be able to ignore or filter out signals at frequencies other than the respective modulation signal sidebands. For example, if a blow-by path between the operative transmit chain and the operative receive chain exists prior to the point in the transmit chain at which the modulation signal is added to the calibration signal, then a signal received via the blow-by path would be at the center frequency of the calibration signal, and not at a sideband frequency. In this way, the control circuitry may determine a calibration offset due to solely (or at least more exclusively) mutual coupling between the antenna elements, and the effect on a self-calibration procedure of blow-by within the antenna structure and its associated radio structure (e.g., may determine calibration offsets with more accuracy) may be removed or at least mitigated.

Aspects of the disclosure are initially described in the context of a wireless communications system. Aspects of the disclosure are further illustrated by and described with reference to system diagrams and flowcharts that relate to sideband-based self-calibration of an array antenna system.

FIG. 1 illustrates an example of a wireless communications system 100 in accordance with aspects of the present disclosure. It is to be understood that the wireless communications system 100 is just one example of an operating environment in which the techniques described herein may be utilized, and that the techniques described herein may be applied to any antenna array application. The wireless communications system 100 includes base stations 105, user equipments (UEs) 115, and a core network 130. In some cases, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices. In some cases, base station 105 and UEs 115 may include phased array antennas to establish directional communication links. Carrier frequency bands for millimeter-wave signals might not be contiguous in the frequency spectrum band. To receive different non-contiguous frequency bands, a receiver may include a selection circuit and a plurality of single-band circuits to extract specific frequency band signals from a wide-band radio-frequency signal. In some cases, the wide-band radio-frequency signal may be a wide-band millimeter-wave signal comprising a subset of frequency bands of the radio frequency spectrum.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 and downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some cases, a base station 105 may be movable and therefore provide communication coverage for a moving geographic coverage area 110. In some cases, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., using a carrier). A cell may be associated with an identifier that may distinguish the cell from neighboring cells (e.g., a physical cell identifier (PCID), a virtual cell identifier (VCID), etc.) operating via the same or a different carrier. In some cases, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some cases, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some cases, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some cases half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another using backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some cases, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some cases, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. In some cases, a phased array antenna system at a transmitting device or a receiving device may apply a phase and/or amplitude adjustment to one or more individual signals exchanged via corresponding individual antenna elements to adjust transmission characteristics of an overall composite beam formed the individual signals. For example, the phased array antenna system may apply different phase offsets to the individual signals via phase shifters respectively coupled with the different antenna elements of the phased array antenna. The adjustments for each of the individual signals may be defined according to a set of codebook offsets (which may alternative be referred to as a beamforming weight set) associated with a particular orientation of the phased array antenna system (e.g., beam direction for transmitting or receiving signals)—one or more sets of codebook offsets, each corresponding to a respective beam direction, may be referred to as a codebook.

In one example, a base station 105 may use multiple antennas or antenna arrays (which may also be referred to as array antennas) to conduct beamforming operations for directional communications with a UE 115. For instance, some signals (e.g. synchronization signals, reference signals, beam selection signals, or other control signals) may be transmitted by a base station 105 multiple times in different directions, which may include transmitting a signal according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some cases, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some cases a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate using logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly via a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications via a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some cases, signal waveforms transmitted using a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications using a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some cases (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some cases, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some cases the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some cases, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some cases, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods.

In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some cases, NR shared spectrum may increase spectrum utilization and spectral efficiency, specifically through dynamic vertical (e.g., across the frequency domain) and horizontal (e.g., across the time domain) sharing of resources.

Devices operating in the various communications systems contemplated herein may use array antenna (e.g., a phased array antenna) to generate directional communication links in different directions by manipulating phase and/or amplitude relationships between signals transmitted and received by the individual antenna elements of the phased array antenna. For example, the phased array antenna may be configured to exchange signals with a target device via one or more beams, and the phased array antenna system may engage in self-calibration to refine its beamforming capabilities. For example, as described herein, an array antenna system may self-calibrate using sidebands of a calibration signal to account for mutual coupling at the antenna elements of the array antenna while mitigating the impact of blow-by at other points within the array antenna system.

While the wireless communications system 100 may be described herein as an LTE network, an LTE-A network, an LTE-A Pro network, or an NR network, it should be understood that the techniques described herein may be similarly applicable in other types of communications networks. For example, the techniques described herein may be implemented in a local area network (LAN) (e.g., a wireless LAN (WLAN) technology such as the Institute of Electrical and Electronics Engineers (IEEE) 802.11 (Wi-Fi)), metropolitan area network (MAN), wide area network (WAN), or any other suitable public or private network and may be connected to other communications networks such as the Internet, telephony networks (e.g., Public Switched Telephone Network (PSTN), etc.), and the like. As such, the techniques described herein may be suitable for communications (e.g., point-to-point and point-to-multipoint communications) by any suitable communications device, such as a mobile or stationary communications device (e.g., radar) or a communications device aboard any terrestrial, airborne, waterborne, or satellite installation or vehicle.

Figure 2:
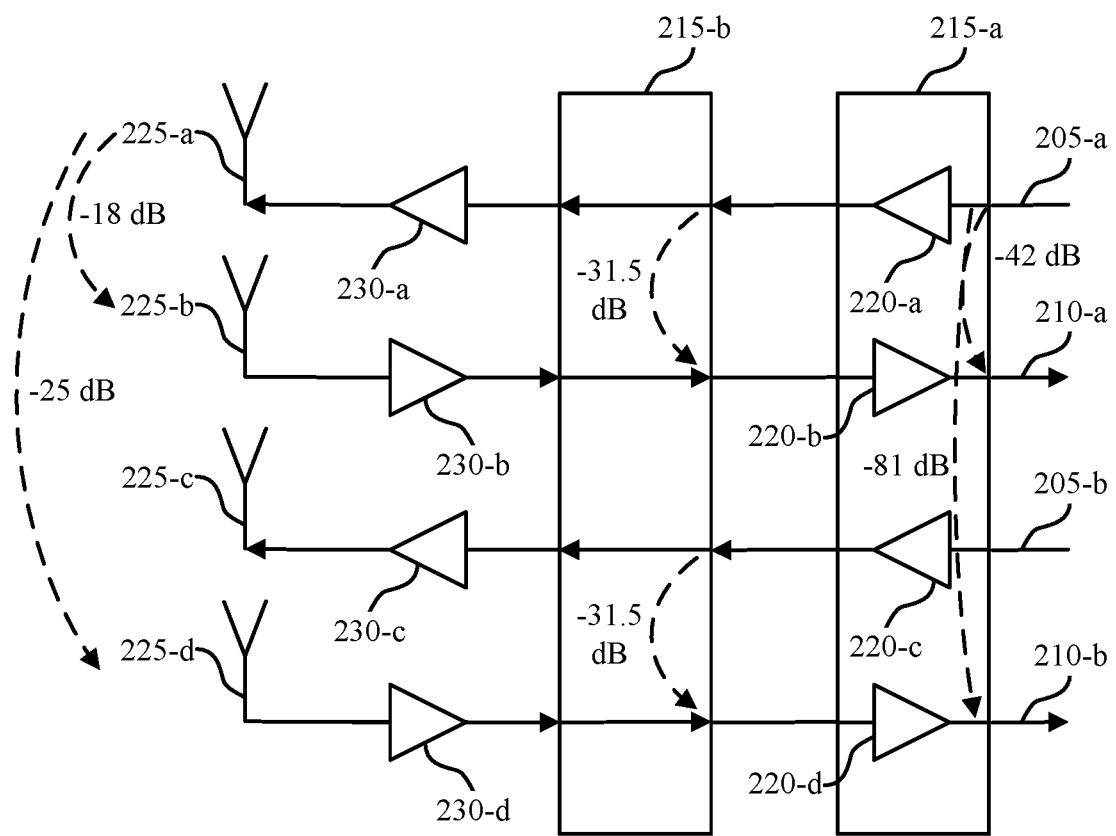
FIG. 2 illustrates an example of an array antenna system in accordance with aspects of the present disclosure.

FIG. 2 illustrates an example of an array antenna system 200 in accordance with aspects of the present disclosure. In some cases, the array antenna system 200 may include an antenna array, such as a phased array antenna. In some cases, one or more of the base stations 105 and/or one or more of the UEs 115, as described with reference to FIG. 1, may each include an instance of the array antenna system 200. The array antenna system 200 may also be used in other applications (e.g., any other phased array antenna application) and thus may, for example, also be installed on vehicles such as cars, trucks, boats, airplanes, trains, satellites, and the like.

As shown in FIG. 2, the array antenna system 200 includes multiple transmit chains 205, receive chains 210, structures 215, first circuitry elements 220, antenna elements 225, and second circuitry elements 230. The structures 215 may be any structure capable of introducing electromagnetic coupling between the transmit chains 205 and receive chains 210 (e.g., parasitic couplings due to the layout of the array antenna system 200). For example, the structures 215 may each include one or more aspects of a chassis, a PCB, circuitry connections, or any other medium capable of electromagnetic coupling. Blow-by may include any coupling between components of the array antenna system 200 other than the over-the-air mutual coupling between antenna elements 225, as described above.

The first circuitry elements 220 and the second circuitry elements 230 may represent any type of radio frequency (RF) circuitry or components, for example: phase shifters, transmission lines, amplifiers, filters, mixers, couplers, and the like. Signals may be transmitted or received via the antenna elements 225 with different phases and/or amplitudes to form an antenna beam with desired characteristics. For example, the array antenna system 200 may adjust the phases of the signals transmitted or received by the different antenna elements 225 (e.g., by adjusting the phase offset introduced by respective phase shifters for the antenna elements 225). Additionally or alternatively, the array antenna system 200 may adjust an amplitude of the signals transmitted or received by the different antenna elements 225 (e.g., by adjusting the gain of one or more amplifiers or other components in a transmit chain 205 or receive chain 210 for each of the corresponding antenna elements 225). Accordingly, for example, the array antenna system 200 may configure the signals exchanged via the antenna elements 225 (e.g., having differently or independently configured phases and/or amplitudes) to collectively form a composite beam with a particular radiation pattern and steer the beam in a desired direction (e.g., to track a target receiver/transmitter).

The array antenna system 200 is illustrated as including two transmit chains 205 and two receive chains 210, each of which may be coupled with a respective one of the antenna elements 225. For example, a first transmit chain 205-*a* may pass a transmit signal through the first structure 215-*a* (which includes a first circuitry element 220-*a*), the second structure 215-*b*, and a second circuitry element 230-*a* to be transmitted at an antenna element 225-*a*. A second transmit chain 205-*b* may pass a transmit signal through the first structure 215-*a* (which includes a first circuitry element 220-*c*), the second structure 215-*b*, and a second circuitry element 230-*c* to be transmitted at an antenna element 225-*c*. Analogously, a first receive chain 210-*a* may receive a receive signal at an antenna element 225-*b* and pass the receive signal through a second circuitry element 230-*b*, the second structure 215-*b*, and a first circuitry element 220-*b* (included in the first structure 215-*a*). A second receive chain 210-*b* may receive a receive signal at an antenna element 225-*d* and pass the receive signal through a second circuitry element 230-*d*, the second structure 215-*b*, and a first circuitry element 220-*d* (included in the first structure 215-*a*). Each of the transmit chains 205 and the receive chains 210 may be connected to, for example, a DSP or other control circuitry that provides, receives, or processes these respective signals.

It should be appreciated that any number of transmit chains 205, receive chains 210, and antenna elements 225 may be implemented similarly in the array antenna system 200. Further, while FIG. 2 shows each antenna element 225 coupled with either a transmit chain 205 or a receive chain 210, one or more antenna chains may alternatively perform the operations for both transmitting and receiving signals and may be configured in (e.g., switched between) either direction.

Mutual coupling may exist between the antenna elements 225, which may increase as the space between antennal elements 225 decreases, and may also vary based on other factors (e.g., based on an associated radio structure). FIG. 2 shows numerous example path loss measurements in terms of the decibel (dB) amount of attenuation, but it should be understood that the measurements shown for the example array antenna system 200 of FIG. 2 are provided for clarity of illustration and may vary according to different particular configurations of other antenna systems. As shown in FIG. 2, mutual coupling between the antenna element 225-*a* and the antenna element 225-*b* may occur with an attenuation of −18 dB, and mutual coupling between the antenna element 225-*a* and the antenna element 225-*d* may occur with an attenuation of −25 dB (e.g., due to increased separation between the antenna element 225-*a* and the antenna element 225-*d* relative to the separation between the antenna element 225-*a* and the antenna element 225-*b*). Mutual coupling with a −10 dB attenuation may, for example, cause a 1 dB error in the amplitude and a 6 degree error in the phase of a transmit or receive beam.

In some cases, a UE or base station may perform a self-calibration procedure to account for errors in relative amplitude and/or phase between the antenna elements 225, which may occur, for example, due to mutual coupling, fabrication inaccuracy, or any other source of error. That is, the antenna elements 225 may be used to measure a phase and/or amplitude difference (offset) between each other based on transmitting a signal from one antenna element 225 and receiving the signal at another antenna element 225. For example, the UE or base station may transmit a calibration signal from the first antenna element 225-*a* and receive the calibration signal at the second antenna element 225-*b*. The UE or base station may measure and compute a difference (e.g., of phase and/or amplitude) between the calibration signal as transmitted at the first antenna element 225-*a* and as received at the second antenna element 225-*b*, where a signal path between the first antenna element 225-*a* and the second antenna element 225-*b* includes mutual coupling (i.e., is a mutual coupling path). The mutual coupling path may be measured in terms of both mutual coupling between the antenna elements 225 and error in the per-element amplitude and/or phase for signals exchanged via individual transmit chains 205 and receive chains 210. Repeating such measurements for more than one pair of antenna elements 225 may allow the UE or base station to calibrate the array antenna system 200 by computing per-element amplitude and/or phase errors, which may be used as (or used to determine) calibration offsets.

However, in some cases, the accuracy of self-calibration may suffer due to the impact of blow-by. For example, mutual coupling between the calibration signal transmitter and receiver caused by blow-by (e.g., due to the structures 215 or other blow-by paths) may obscure the measurement of over-the-air mutual coupling on the mutual coupling path between the calibration signal transmitter and receiver (i.e., respective antenna elements 225). In some cases, a signal received via one or more blow-by paths may have an amplitude and/or phase comparable to that of a signal received the over-the-air mutual coupling between operative antenna elements 225. For example, as shown in FIG. 2, blow-by between the transmit chain 205-*a* and the receive chain 210-*a* via the first structure 215-*a* may occur with an attenuation of −42 dB, and blow-by between the transmit chain 205-*a* and the transmit chain 210-*a* via the second structure 215-*b* may occur with an attenuation of −31.5 dB, while over-the-air mutual coupling between the first antenna element 225-*a* and the second antenna element 225-*b* may occur with an attenuation of −18 dB.

Thus, if a calibration signal is sent via the entire illustrated first transmit chain 205-*a* and received via the entire illustrated first receive chain 210-a, the observed received signal may comprise a combination of a signal received through the first blow-by path at the first structure 215-a (at an attenuation of −42 dB), a signal received through the second blow-by path at the second structure 215-b (at an attenuation of −31.5 dB), and a signal received through the mutual coupling path (at an attenuation of −18 dB). A similar combination signal would be observed if received via the entire illustrated second receive chain 210-b, but with a different combination of attenuation levels. In some cases, the UE or base station performing self-calibration may be unable or limited in its ability to differentiate between the different sources of the aggregate received signal—that is, the UE or base station may be unable or limited in its ability to distinguish the amplitude and/or phase of the signal received through the mutual coupling path between the antenna elements 225 from the signals received through blow-by paths—and thus may be unable, or limited in its ability, to accurately calibrate the array antenna system 200. Thus, the presence of blow-by may mask or otherwise inhibit the ability of the control circuitry to measure characteristics of the over-the-air mutual coupling paths, along with impacting other RF performance measurements. Techniques are described herein to provide a self-calibration technique that may provide increased accuracy, including in the presence of blow-by.

Figure 3:
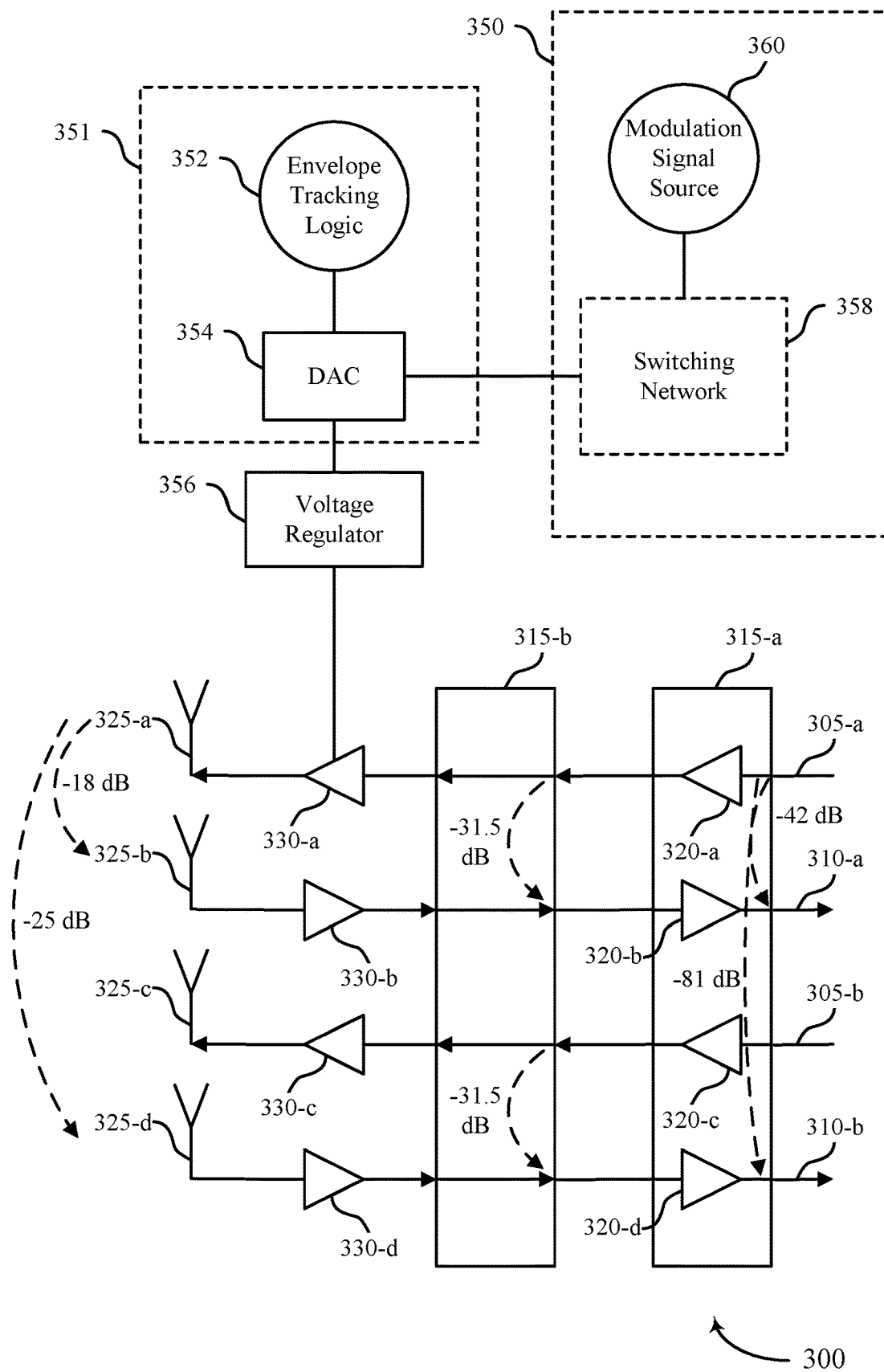
FIG. 3 illustrates an example of an array antenna system in accordance with aspects of the present disclosure.

FIG. 3 illustrates an example of an array antenna system 300 in accordance with aspects of the present disclosure. In some cases, the array antenna system 300 may include an antenna array, such as a phased array antenna. In some cases, one or more of the base stations 105 and/or one or more of the UEs 115, as described with reference to FIG. 1, may each include an instance of the array antenna system 300. The array antenna system 300 may also be used in other applications (e.g., any other phased array antenna application) and thus may, for example, also be installed on vehicles such as cars, trucks, boats, airplanes, trains, satellites, and the like.

In some cases, self-calibration of the array antenna system 300 may include measuring a path loss (which may include measuring an attenuation and/or a phase shift) for a signal path between a first antenna element 325 and a second antenna element 325, where the signal path includes as one component over-the-air mutual coupling between the first antenna element 325 and the second antenna element 325. Path losses for multiple such signal paths may be measured, for example, for a first signal path that includes mutual coupling between a first pair of antenna elements 325, for a second signal path that includes mutual coupling between a second pair of antenna elements 325, and so on for any number of pairs of antenna elements 325. In some cases, the array antenna system 300 may determine a path loss for one signal path based on measurements for one or more other signal paths (e.g., based on symmetry or other known aspects of the multiple signal paths).

As shown in FIG. 3, the array antenna system 300 includes multiple transmit chains 305, receive chains 310, structures 315, first circuitry elements 320, antenna elements 325, and second circuitry elements 330, which may be examples of the corresponding components (transmit chains 205, receive chains 210, structures 215, first circuitry elements 220, antenna elements 225, and second circuitry elements 230, respectively) as described with reference to FIG. 2. As shown in the example illustrated of FIG. 3, the array antenna system 300 may further include a modulator 350. The modulator 350 may refer to any component configured to inject a modulation signal into a signal conveyed by a transmit chain 305. As further described below, the modulator 350 may in some cases include a modulation signal source 360 and a switching network 358. As also further described below, in some cases the modulator 350 may be configured to inject the modulation signal (and thus modulate the calibration signal) by modulating a voltage supply for a second circuitry element 330 included in the transmit chain 305. For example, the second circuitry element 330 may be an amplifier, and the voltage supply modulated by the modulator 350 may be a voltage regulator 356 (e.g., a variable voltage regulator, a power management integrated circuit (PMIC), etc.) coupled with the amplifier. The envelope tracking system 351 may be coupled with the voltage regulator 356 and may include a digital-to-analog converter (DAC) 354 and envelope tracking logic 352.

Figure 4:
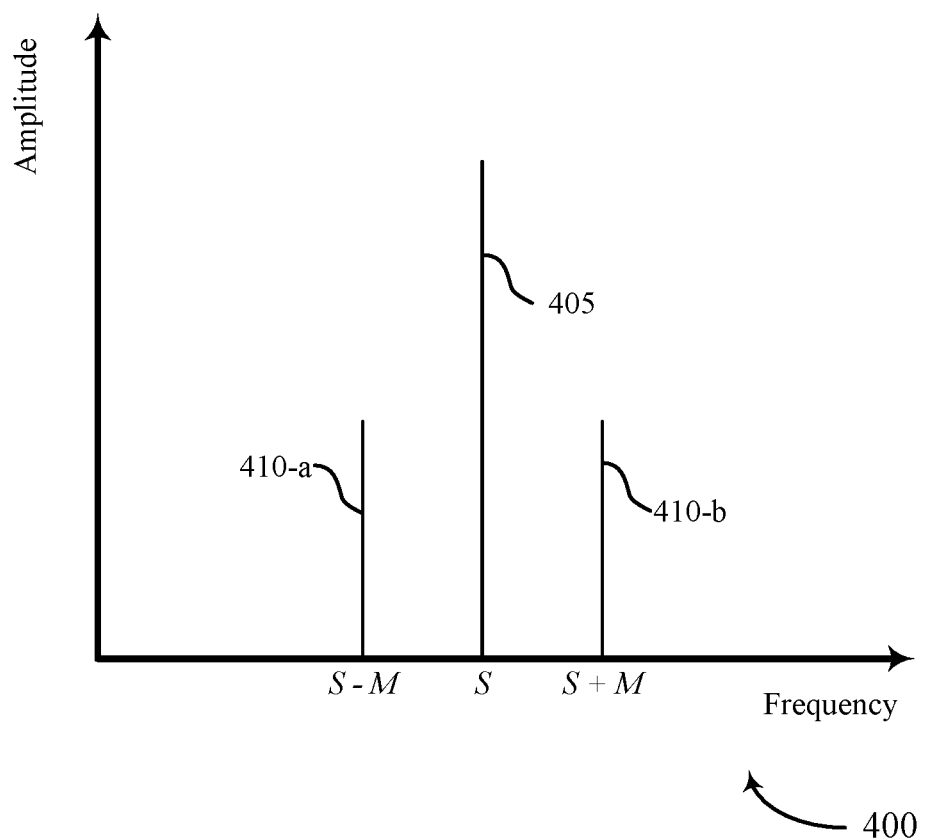
FIG. 4 illustrates an example of a calibration signal in accordance with aspects of the present disclosure.

In some cases, the modulator 350 may introduce (or inject) a modulation signal generated by a modulation source (e.g., the modulation signal source 360) into a first signal input to a transmit chain 305 (which may alternatively be referred to as an input signal) at some point within the transmit chain 305 (e.g., via the second circuitry element 330-a) in order to produce a calibration signal. Referring now to FIG. 4, which illustrates aspects of a calibration signal 400 in accordance with aspects of the present disclosure, introducing a modulation signal (having a frequency M) into the input signal (having a frequency S) at some point within the transmit chain 305 may yield a calibration signal that includes a center signal 405 at a center frequency (S) (e.g., the frequency of the input signal) and two sideband signals 410 at frequencies offset from the center frequency (e.g., offset from S by +/−M). As shown in FIG. 4, the calibration signal 400 may thus include the center signal 405 at frequency S, a first sideband signal 410-a at a frequency S−M, and a second sideband signal 410-b at a frequency S+M.

Referring again to FIG. 3, if the modulation signal is introduced at a point (e.g., at the second circuitry element 330-a, which may be, e.g., a power amplifier) in the transmit chain 305 that is after one or more blow-by paths (e.g., nearer to the transmitting antenna element 325 than the structures associated with the one or more blow-by paths), then as observed at a receive chain 310, the calibration signal 400 may have sideband signals 410 that are unimpacted by the one or more blow-by paths. For example, as observed at the output of a receive chain 310, the calibration signal 400 at the center frequency S (that is, the center signal 405) may include a signal component received via the mutual antenna coupling path between the operative antenna elements 325 (e.g., the −18 dB path between the first antenna element 325-a and the second antenna element 325-b) as well as components received via the applicable blow-by paths (e.g., the −42 dB blow-by path at the first structure 315-a and the −31.5 dB blow-by path at the second structure 315-b)—thus, at the center frequency S, the calibration signal 400 may be impacted (corrupted) by blow-by. At a sideband frequency S+/− M, however, the calibration signal 400 as observed at a receive chain 310 may not include any signal components received via the applicable blow-by paths, and thus may be used to more accurately determine one or more characteristics of the mutual antenna coupling path.

Self-calibration of the array antenna system 300 based on one or more sideband signals 410 thus may beneficially isolate the impact of the mutual antenna coupling between the operative antenna elements 325 from the impact of blow-by and thereby enhance the accuracy of the self-calibration. In some cases, only one sideband signal 410 may be used (e.g., by a DSP) to calibrate the array antenna system 300. Alternatively, two sideband signals 410 (e.g., by a DSP) may be used to calibrate the array antenna system 300, which may provide for improved signal-to-noise ratio (SNR) measurement. The modulation signal may be amplitude-, phase-, or frequency-modulated, or any combination thereof. Similarly, self-calibration of the array antenna may be based on an amplitude or a phase of a sideband signal 410, or any combination thereof.

In some cases, the modulation signal may be amplitude-modulated. For example, the modulation signal may be created and injected into the input signal via an envelope tracking system 351, as illustrated in the example array antenna system 300 of FIG. 3. The second circuitry element 330-*a* may be an amplifier (e.g., a power amplifier). Under normal operation, the envelope tracking system 351 may adjust a voltage supplied (output) by the voltage regulator 356 to the amplifier based on the input signal received by the amplifier in order to optimize the efficiency of the amplifier—e.g., so that the voltage supplied to the amplifier tracks the rises and falls of the input signal, thereby reducing voltage and the amount of power supplied to the amplifier when less power is needed to amplify the input signal.

For example, the DAC 354 may be configured to receive a digitized input signal (e.g., a series of binary numbers) and output an analog signal (voltage) that is based on (e.g., proportional to) the digitized input signal, and the voltage output by the voltage regulator 356 may be based on (e.g., proportional to) the analog signal output by the DAC. The digitized input signal may be received from the envelope tracking logic 352, and may be generated by the envelope tracking logic 352 based on the signal input to and amplified by the amplifier. For example, the envelope tracking logic 352 may receive information about the input signal (e.g., from control circuitry (not shown)) and may adjust the digitized signal input to the DAC and thus the voltage output by the voltage regulator 356 to track the rises and falls of the input signal voltage. Though FIG. 3 shows only one voltage regulator 356 and envelope tracking system 351 for visual clarity, it is to be understood that the array antenna system 300 may include any number of voltage regulators 356 and envelope tracking systems 351 (e.g., one for each transmit chain 305).

As part of a self-calibration procedure, however, the DAC may instead receive a digitized input signal from (or otherwise based on a signal generated by) the modulation signal source 360, which may be independent of (uncorrelated with) the input signal to the transmit chain 305-*a*. The modulation signal source 360 may cause the digitized signal input to the DAC 354—and thus the analog signal output by the DAC 354 and the voltage output by the voltage regulator 356—to vary at the modulation frequency M Thus, a signal derived from the output of the modulation signal source 360 may be provided to the second circuitry element 330-*a* (e.g., to a low-voltage rail of the second circuitry element 330-*a*) via the voltage regulator 356. In this way, the input signal may be modulated by the modulation signal at a point in the first transmit chain 305-*a* after the blow-by paths, or at least after the blow-by paths of primary concern (e.g., after structures 315).

In the example of FIG. 3, any of a signal output by the modulation signal source 360, a digitized signal input to the DAC 354, an analog signal output by the DAC 354, or a voltage output by the voltage regulator 356 may be considered a modulation signal, as each may vary at the modulation frequency M and each may serve to modulate the input signal and introduce sidebands 410 into the calibration signal 400 at frequencies S+/−M.

The modulation signal source 360 may be coupled with the DAC 354 directly or in some cases by the switching network 358. For example, the array antenna system 300 may include one modulator 350 for each transmit chain 305. As another example, a modulator 350 may be selectively coupled (e.g., by the switching network 358) with any number of transmit chains 305, and thus the array antenna system 300 may include one or any other number of modulators 350 (e.g., the transmit chains 305 may be divided into groups, and the array antenna system 300 may include one modulator 350 per group). A modulator 350 shared by (selectively couplable with) multiple transmit chains 305 may provide a modulation signal to one of the transmit chains 305 at a time, for example.

Whether as shown in the example of FIG. 3 or otherwise, a first signal having center frequency S may be introduced at a first point of the first transmit chain 305-*a*, and a second signal (e.g., the modulation signal) having modulation frequency M may be introduced at a second point of the first transmit chain 305-*a*, creating a combined calibration signal with sidebands at frequencies S+M and S−M. The second point (e.g., after the second structure 315-*b*) of the first transmit chain 305-*a* may be nearer (in terms of the direction of signal flow) the first antenna element 325 than the first point (e.g., prior to the first structure 315-*a*). In some cases, the signal path from the second point of the first transmit chain 305-*a* to the first antenna element 325 may be or may include a subset of the signal path from the first point of the first transmit chain 305-*a* to the first antenna element 325.

In some cases, the signal path from the second point of the first transmit chain 305-*a* to the first antenna element 325 may include only passive RF circuitry or components (i.e., passive RF circuitry may not introduce additional net energy to the system, versus active RF that may rely on a source of energy). Accordingly, in some cases, the signal path between the second point of the first transmit chain 305-*a* and the first antenna element 325 may not include additional active RF circuitry or components that increase the power of the signal (e.g., no additional amplifiers, though, in some cases, transmission lines, switches, and the like may lie in this signal path), which may provide for a relatively minimized opportunity for further unaccounted for parasitic cross-coupling, as further described below. For example, the signal path from the second point of the first transmit chain 305-*a* to the first antenna element 325 may be ohmic (e.g., have linear voltage/current characteristics). In some cases, the input signal may have been amplified (e.g., by first circuitry element 320-*a*) before reaching the second point at which the modulation signal is introduced. Also, where the modulation signal is injected via an active RF component (e.g., by modulating a voltage supply for an amplifier), that an active RF component itself may not be considered an additional active RF component or as providing additional amplification prior to the calibration signal 400 reaching the first antenna element 325-*a*.

A calibration signal 400 with the injected modulation signal may be transmitted at the first antenna element 325-*a* and received at the antenna element 325-*b* or the antenna element 325-*d*. The received calibration signal may then be provided back to the control circuitry (e.g., DSP), which may analyze one or more of the associated sideband signals 410. For example, the control circuitry may determine an amplitude, phase offset, or other characteristic (parameter, metric) of the one or more sideband signals 410, and thus determine one or more properties of the mutual coupling path between the first antenna element 325-*a* the antenna element 325-*b* or the antenna element 325-*d* (e.g., an associated path loss). The control circuitry may determine, based on the one or more determined properties of an associated mutual coupling path, and apply calibration offsets to signals communicated via one or more of the antenna elements 325-*a*, 325-*b*, 325-*d* (e.g., by adjusting phase shifters in the associated transmit chains 305 or receive chains 310 based on the calibration offsets).

By adding the modulation signal as close to the antenna element 325-*a* as possible, the impact of blow-by on the sideband signals 410 may be reduced or eliminated—rather, any attenuation or phase shift observed for a received sideband signal 410 relative to the transmitted sideband signal 410 may be primarily or exclusively from over-the-air mutual coupling between the transmitting and receiving antenna elements 325. In this way, the control circuitry may be able to isolate and accurately determine one or more characteristics of the over-the-air mutual coupling path.

It should be understood that injecting a modulation signal at a second circuitry element 330 is only one example point on a transmit chain 305 that a modulation signal may be injected. In some cases, a modulation signal may be added at another point along a transmit chain 305, such as, for example, a point between the first structure 315-*a* and the second structure 315-*b*. For example, if blow-by associated with the second structure 315-*b* is much less significant (e.g., occurs with much greater attenuation) than blow-by associated with the second structure 315-*b*, the modulation signal may be injected between the first structure 315-*a* and the second structure 315-*b* (e.g., at an additional amplifier that may be located between the first structure 315-*a* and the second structure 315-*b*, or using an adder or a combiner node). In this example, because the modulation signal is added after the first structure 315-*a*, the sideband signals 410 used to determine the mutual coupling between the antenna elements 325 may not be substantially impacted by blow-by associated with the first structure 315-*a*.

In some cases, the described techniques may provide for relatively reduced design requirements of a radio with respect to isolation between one transmit chain 305 or receive chain 310 and another transmit chain 305 or receive chain 310. The described techniques also may support improved self-calibration of an array antenna system, among other benefits that may be appreciated by one of ordinary skill in the art. The described techniques may be implemented in a variety of systems, including but not limited to phased array antenna systems. For example, the described techniques may be used with beamforming calibration techniques using a coupler (or probe) at a feed portion of the radio system (e.g., for phased array antenna systems using built-in self-test (BIST) techniques). Further, in some cases, the described techniques may be used similarly with the different antennas and associated transmit and receive chains of MIMO systems to provide similar benefits.

Figure 5:
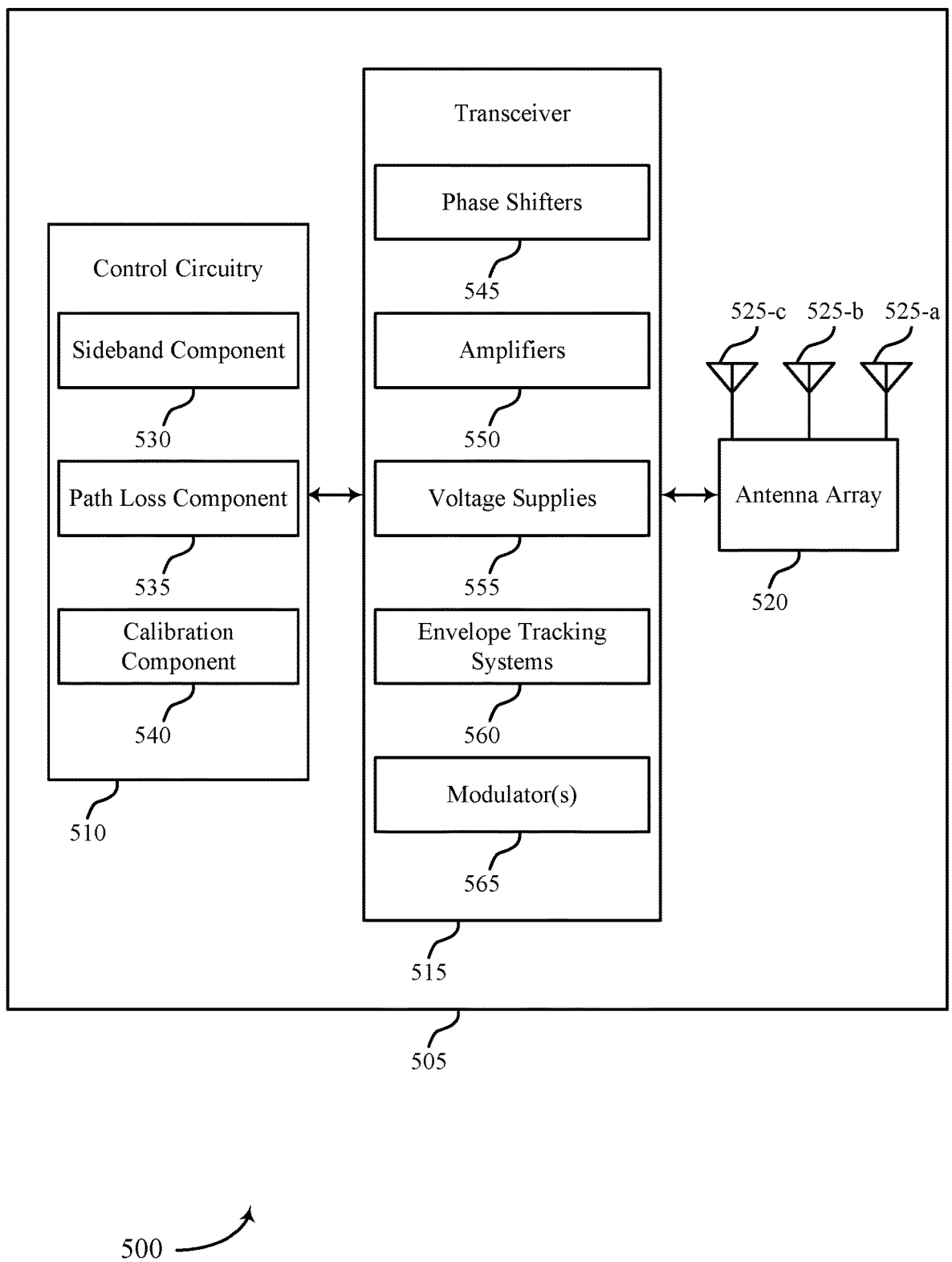
FIG. 5 shows a block diagram of an array antenna system in accordance with aspects of the present disclosure.

FIG. 5 shows a block diagram 500 of an array antenna system 505 in accordance with aspects of the present disclosure. The array antenna system 505 may include control circuitry 510, a transceiver 515, and an antenna array 520. Each of these components and their sub-components may communicate, directly or indirectly, with one another (e.g., via one or more buses or other signal paths).

The antenna array 520 may include any number of antenna elements 525. For example, the antenna array 520 is shown as including three representative example antenna elements 525, including a first antenna element 525-*a*, a second antenna element 525-*b*, and a third antenna element 525-*c*. The antenna array 520 may be an example of a phased array antenna.

The transceiver 515 may include any number of transmit chains and receive chains. Thus, for example, the transceiver 515 may include any number of phase shifters 545, amplifiers 550, voltage supplies 555, and envelope tracking systems 560. The transceiver 515 may also include one or more modulators 565. The transceiver 515 may communicate bi-directionally via the antenna array 520, as described herein, for example, to receive information such as packets, user data, or control information associated with various information channels (e.g., control channels, data channels, and information related to sideband-based self-calibration of an array antenna system, etc.). Signals received via the antenna array 520 may be received by the transceiver 515, and the transceiver 515 may provide signals based on those receive signals to other components of the array antenna system 505, such as the control circuitry 510. Further, the transceiver 515 may receive signals from other components of the array antenna system 505, such as the control circuitry 510, and the transceiver 515 may provide signals based on those receive signals to the antenna array 520 so that they may be transmitted by the antenna array 520.

The control circuitry 510 may include a sideband component 530, a path loss component 535, and a calibration component 540. The control circuitry 510, or its sub-components, may be implemented in hardware, code (e.g., software or firmware) executed by a processor, or any combination thereof. The functions of the control circuitry 510, or its sub-components may be implemented by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

Further, the control circuitry 510, or its sub-components, may be physically located at various positions, including being distributed such that portions of functions are implemented at different physical locations by one or more physical components. In some cases, the control circuitry 510, or its sub-components, may be a separate and distinct component in accordance with aspects of the present disclosure. In some cases, the control circuitry 510, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The calibration component 540 may cause the transceiver 515 to transmit, via a first antenna element 525-*a* of the antenna array 520, a calibration signal that comprises a first signal having a first frequency and that is modulated by a second signal having a second frequency, and the transceiver 515 may receive the calibration signal via a second antenna element 525-*b* of the antenna array 520. In some cases, the calibration component 540 may cause the transceiver 515 to modulate at least one of an amplitude, phase, or frequency of the second signal.

The sideband component 530 may analyze a sideband of the received calibration signal, where the sideband has a third frequency that is offset from the first frequency by the second frequency. In some cases, analyzing the sideband includes determining an amplitude of the received calibration signal at the third frequency. In some cases, analyzing the sideband includes determining a phase of the received calibration signal at the third frequency.

The path loss component 535 may determine, based on analyzing the sideband, a path loss (e.g., an attenuation and/or a phase shift) for a signal path that includes mutual coupling between the first antenna element 525-*a* of the antenna array 520 and the second antenna element 525-*b* of the antenna array 520.

The calibration component 540 may calibrate the array antenna system 505 based on the determined path loss. In some cases, calibrating the array antenna system 505 includes calibrating at least one of a first phase shifter 545 coupled with the first antenna element 525-*a* or a second phase shifter 545 coupled with the second antenna element 525-*b*.

In some cases, the control circuitry 510 may analyze a second sideband of the received calibration signal, where the second sideband has a fourth frequency, the first frequency is between the third frequency and the fourth frequency, and determining the path loss is based on analyzing the second sideband. In some cases, the fourth frequency is offset from the first frequency by the second frequency.

In some cases, the transceiver 515 may introduce the first signal at a first point of a transmit chain for the first antenna element 525-*a* and introduce the second signal at a second point of the transmit chain for the first antenna element 525-*a*. In some cases, the second point of the transmit chain is nearer the first antenna element 525-*a* than the first point of the transmit chain. In some cases, the first point of the transmit chain is coupled with the first antenna element 525-*a* via a first signal path, and the second point of the transmit chain is coupled with the first antenna element 525-*a* via a second signal path that is a subset of the first signal path.

In some cases, introducing the second signal at the second point of the transmit chain includes introducing the second signal via an amplifier 550 included in the transmit chain. In some cases, introducing the second signal via the amplifier 550 includes modulating a supply voltage (e.g., as provided by a voltage supply 555) of the amplifier based on the second signal. In some cases, the amplifier 550 is a power amplifier that is coupled with the first antenna element 525-*a* via a signal path that lacks additional power amplification. In some cases, the amplifier 550 is coupled with the first antenna element 525-*a* via an ohmic signal path.

Within the transceiver 515, a transmit chain may include at least a first amplifier 550. The first amplifier 550 may receive a first signal having a first frequency and output a calibration signal based on the first signal. In some cases, a modulator 565 may modulate the calibration signal based on a second signal (e.g., a modulation signal) having a second frequency, and modulating the calibration signal may include modulating a voltage supply 555 for the first amplifier 550. In some cases, the second signal may be independent of the first signal (e.g., variations in the voltage, phase, or another property of the second signal may be independent of any variations in the first signal).

A first antenna element 525-*a* of the antenna array 520 may be coupled with the first amplifier 550, and the first antenna element 525-*a* may be configured to transmit the calibration signal. A second antenna element 525-*b* of the antenna array 520 may be configured to receive the calibration signal from the first antenna element 525-*a*.

The side band component 530 may determine an amplitude of a sideband of the received calibration signal, where the sideband has a third frequency that is offset from the first frequency by the second frequency. The calibration component 540 may calibrate the array antenna system 505 based on the determined amplitude of the sideband. In some cases, a phase shifter 545 may be coupled with the first antenna element 525-*a*, and the calibration component 540 may calibrate the array antenna system 505 based on calibrating the phase shifter 545. In some cases, the path loss component 535 may determine, based on the determined amplitude of the sideband, a path loss for a signal path between the first antenna element and the second antenna element, where the calibrating may be based on the determined path loss.

In some cases, the sideband component 530 may determine an amplitude of a second sideband of the received calibration signal, where the second sideband has a fourth frequency, and where the first frequency is between the third frequency and the fourth frequency. The calibration component 540 may calibrate the array antenna system 505 based on the determined amplitude of the second sideband.

In some cases, the transmit chain may include a second amplifier 550. The second amplifier 550 may be coupled with the first amplifier 550, and the second amplifier 550 may be configured to receive an input signal and output the first signal based on amplifying the input signal. In some cases, the first and/or second amplifiers 550 may be power amplifiers.

In some cases, the first amplifier 550 may be coupled with the first antenna element 525-*a* of the antenna array 520 via a signal path that lacks additional amplification. In some cases, the first amplifier 550 may be coupled with the first antenna element 525-*a* of the antenna array 520 via an ohmic signal path.

In some cases, the array antenna system 505 may include an envelope tracking system 560 coupled with the voltage supply 555 for the first amplifier 550, and the modulator 565 may modulate the voltage supply 555 for the first amplifier 550 based on being coupled with (e.g., providing one or more signals to) the envelope tracking system 560. In some cases, the envelope tracking system 560 may include a DAC coupled with the voltage supply 555. A voltage of the voltage supply 550 may be based on an analog signal output by the DAC, the analog signal output by the DAC may be based on an input signal for the DAC, and the modulator 565 may modulate the voltage supply 555 for the first amplifier 550 based on modulating the input signal for the DAC. In some cases, the envelope tracking system 560 may include the DAC and envelope tracking logic coupled with the DAC.

In some cases, a switching network (e.g., one or more switching components, such as transistors) may selectively couple the modulator 565 with the first amplifier 550 or with a third amplifier 550. The third amplifier 550 may be coupled with a third antenna element 525-*c* of the antenna array 520.

Figure 6:
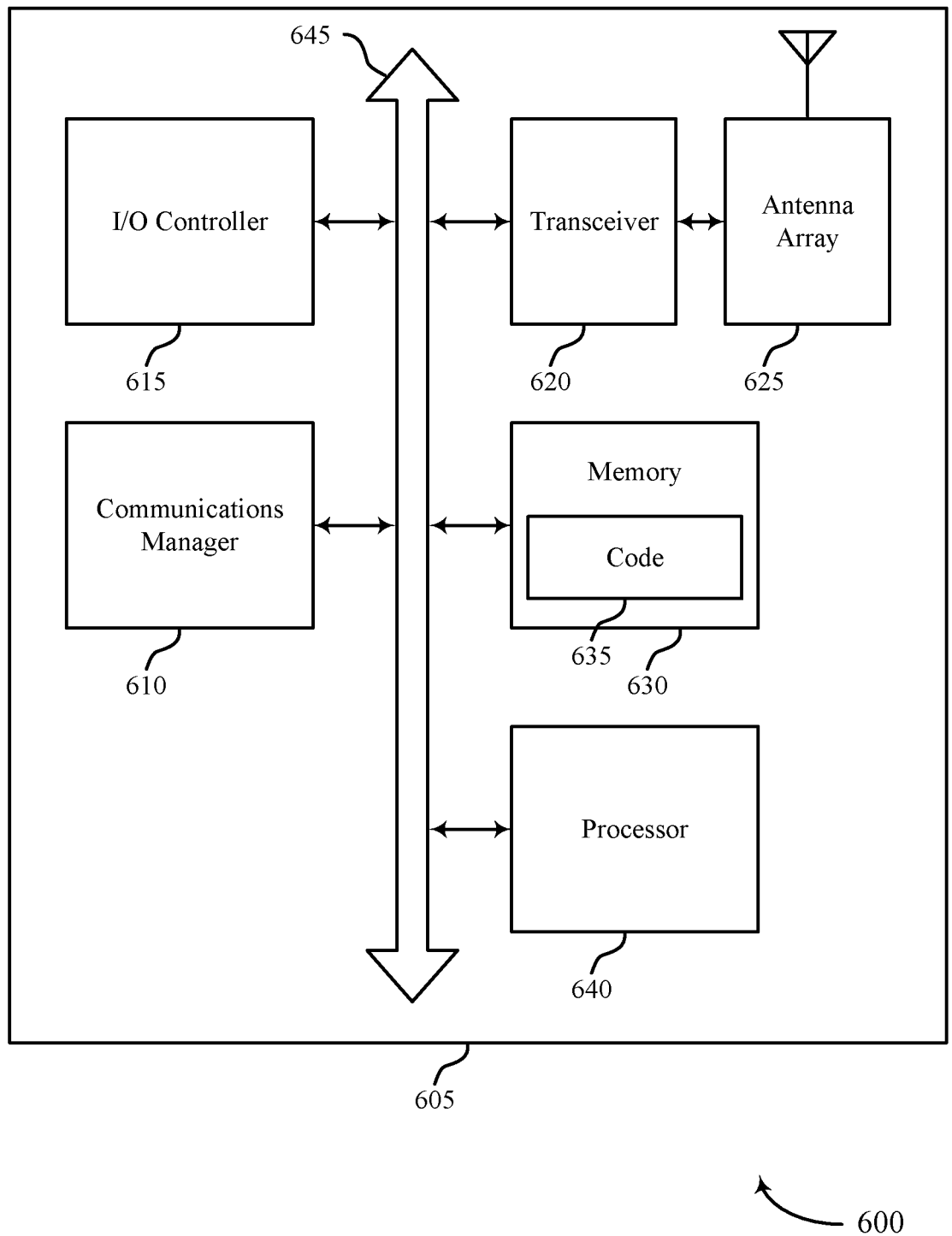
FIG. 6 shows a block diagram of a device in accordance with aspects of the present disclosure.

FIG. 6 shows a diagram 600 of a device 605 in accordance with aspects of the present disclosure. The device 605 may be an example of or include the components of array antenna system 505 or other devices and systems as described herein. The device 605 may include components for bi-directional voice and data communications including components for transmitting and receiving communications, including a communications manager 610, an I/O controller 615, a transceiver 620, an antenna array 625, memory 630, and a processor 640. These components may be in electronic communication via one or more buses (e.g., bus 645).

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may include aspects of the transceiver 515 described with reference to FIG. 5. The transceiver 620 may communicate bi-directionally, via the antenna array 625 (which may include aspects of the antenna array 520 described with reference to FIG. 5) as well as any number of other wired or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

The communications manager 610 may include aspects of the control circuitry 510 described with reference to FIG. 5. For example, the communications manager 610 may cause the transceiver 620 to transmit, via a first antenna element of the antenna array 625, a calibration signal that comprises a first signal having a first frequency and that is modulated by a second signal having a second frequency, and the transceiver 620 may receive the calibration signal via a second antenna element of the antenna array 625. The communications manager 610 may analyze a sideband of the received calibration signal, where the sideband has a third frequency that is offset from the first frequency by the second frequency, and determine, based on analyzing the sideband, a path loss for a signal path that includes mutual coupling between the first antenna element of the antenna array 625 and the second antenna element of the antenna array 625. The communications manager 610 may calibrate the device 605 based on the determined path loss. In some cases, calibrating the device 605 includes calibrating one or more phase shifters included in the transceiver 620.

The memory 630 may include random-access memory (RAM) and read-only memory (ROM). The memory 630 may store computer-readable, computer-executable code 635 including instructions that, when executed, cause the processor to perform various functions described herein. In some cases, the memory 630 may contain, among other things, a Basic Input/Output System (BIOS) which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting sideband-based self-calibration of the antenna array 625).

The code 635 may include instructions to implement aspects of the present disclosure, including instructions to support wireless communications and self-calibration procedures as described herein. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
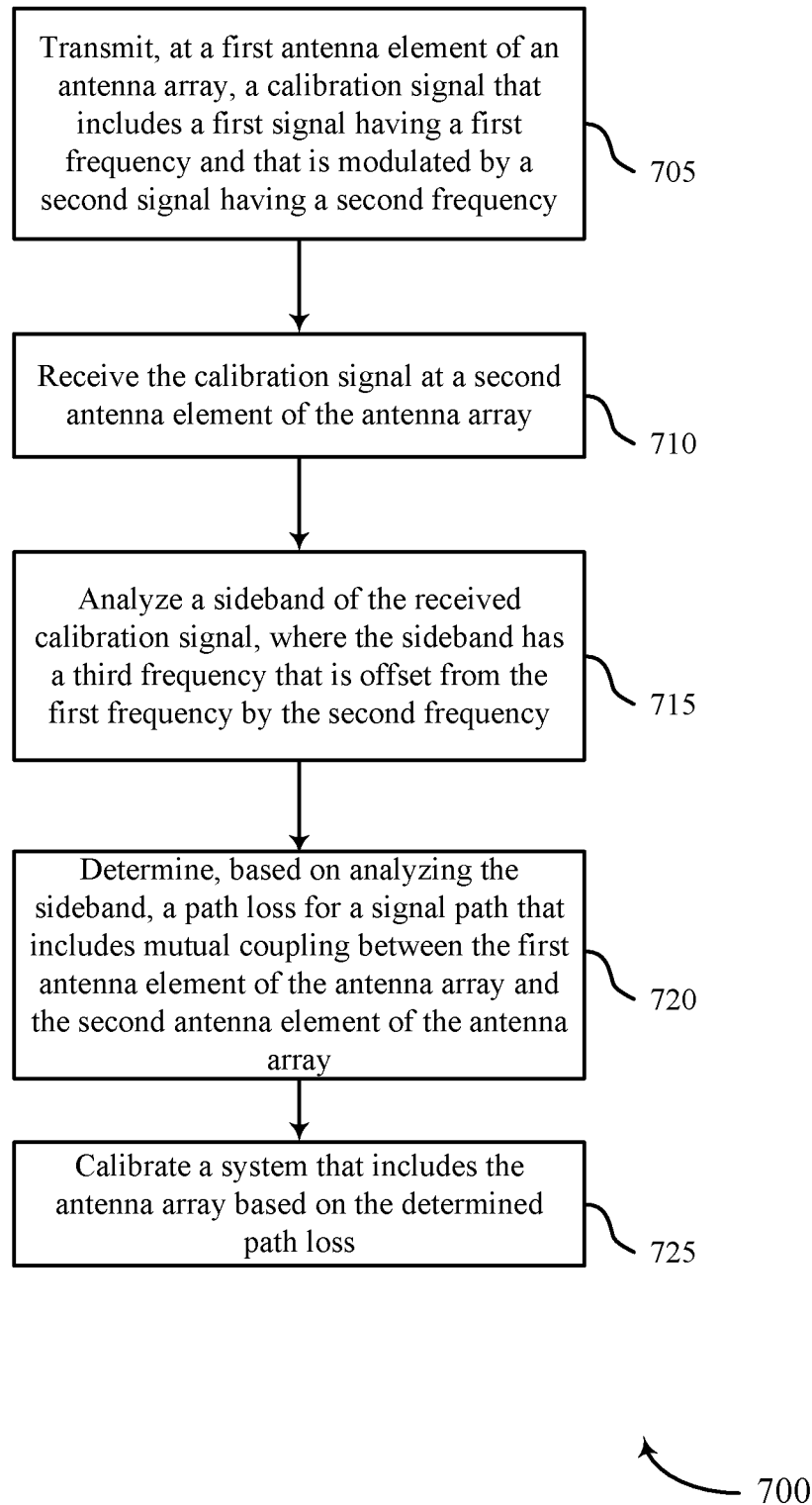
FIG. 7 shows a flowchart illustrating a method in accordance with aspects of the present disclosure.

FIG. 7 shows a flowchart illustrating a method 700 in accordance with aspects of the present disclosure. The operations of method 700 may be implemented by a device or its components as described herein. In some cases, a device may execute a set of instructions to control the functional elements of the device to perform the functions described below. Additionally or alternatively, a device may perform aspects of the functions described below using special-purpose hardware.

At 705, the device may transmit, at a first antenna element of an antenna array, a calibration signal that includes a first signal having a first frequency and that is modulated by a second signal having a second frequency. The operations of 705 may be performed according to the methods described herein. In some cases, aspects of the operations of 705 may be performed by a transceiver and an antenna array as described with reference to FIGS. 5 through 6.

At 710, the device may receive the calibration signal at a second antenna element of the antenna array. The operations of 705 may be performed according to the methods described herein. In some cases, aspects of the operations of 705 may be performed by a transceiver and an antenna array as described with reference to FIGS. 5 through 6.

At 715, the device may analyze a sideband of the received calibration signal, where the sideband has a third frequency that is offset from the first frequency by the second frequency. The operations of 705 may be performed according to the methods described herein. In some cases, aspects of the operations of 705 may be performed by control circuitry as described with reference to FIGS. 5 through 6.

At 720, the device may determine, based on analyzing the sideband, a path loss for a signal path that includes mutual coupling between the first antenna element of the antenna array and the second antenna element of the antenna array. The operations of 705 may be performed according to the methods described herein. In some cases, aspects of the operations of 705 may be performed by control circuitry as described with reference to FIGS. 5 through 6.

At 725, the device may calibrate a system that includes the antenna array based on the determined path loss. The operations of 705 may be performed according to the methods described herein. In some cases, aspects of the operations of 705 may be performed by control circuitry as described with reference to FIGS. 5 through 6.

It should be noted that the methods described above describe possible implementations, and that the operations and the steps may be rearranged or otherwise modified and that other implementations are possible. Further, aspects from two or more of the methods may be combined.

As described herein, a processor may be a general-purpose processor, such as a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions that may be implemented at least in part using the processor (e.g., in communication with the control circuitry, as described with reference to FIGS. 5 through 6, may be implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An antenna system, comprising:
   an amplifier configured to receive a first signal having a first frequency and output a calibration signal based at least in part on the first signal;
   a modulator configured to modulate the calibration signal based at least in part on a second signal having a second frequency, wherein modulating the calibration signal comprises modulating a voltage supply for the amplifier;
   a first antenna element of an array of antenna elements, wherein the first antenna element is coupled with the amplifier and is configured to transmit the calibration signal;
   a second antenna element of the array of antenna elements, wherein the second antenna element is configured to receive the calibration signal from the first antenna element; and
   control circuitry coupled with the second antenna element, wherein the control circuitry is configured to:
   determine an amplitude of a sideband of the received calibration signal, wherein the sideband has a third frequency that is offset from the first frequency by the second frequency; and
   calibrate the antenna system based at least in part on the determined amplitude of the sideband.

2. The antenna system of claim 1, further comprising:
   a phase shifter coupled with the first antenna element, wherein the control circuitry is configured to calibrate the antenna system based at least in part on calibrating the phase shifter.

3. The antenna system of claim 1, wherein the control circuitry is further configured to:
   determine, based at least in part on the determined amplitude of the sideband, a path loss for a signal path between the first antenna element and the second antenna element, wherein the calibrating is based at least in part on the determined path loss.

4. The antenna system of claim 1, wherein the control circuitry is further configured to:
   determine an amplitude of a second sideband of the received calibration signal, wherein the second sideband has a fourth frequency, and wherein the first frequency is between the third frequency and the fourth frequency; and
   calibrate the antenna system based at least in part on the determined amplitude of the second sideband.

5. The antenna system of claim 1, wherein the second signal is independent of the first signal.

6. The antenna system of claim 1, further comprising:
   envelope tracking circuitry coupled with the voltage supply, wherein the modulator is configured to modulate the voltage supply for the amplifier based at least in part on being coupled with the envelope tracking circuitry.

7. The antenna system of claim 1, further comprising:
   a digital-to-analog converter (DAC) coupled with the voltage supply, wherein:
   a voltage of the voltage supply is based at least in part on an analog signal output by the DAC; and
   the analog signal output by the DAC is based at least in part on an input signal for the DAC; and
   the modulator is configured to modulate the voltage supply for the amplifier based at least in part on modulating the input signal for the DAC.

8. The antenna system of claim 7, further comprising:
   envelope tracking circuitry that includes the DAC and envelope tracking logic.

9. The antenna system of claim 1, further comprising:
   a second amplifier coupled with the amplifier, wherein the second amplifier is configured to receive an input signal and output the first signal based at least in part on amplifying the input signal.

10. The antenna system of claim 1, further comprising:
    a switching network configured to selectively couple the modulator with the amplifier or with a third amplifier, wherein the third amplifier is coupled with a third antenna element of the array of antenna elements.

11. The antenna system of claim 1, wherein the amplifier comprises a power amplifier.

12. The antenna system of claim 1, wherein the amplifier is coupled with the first antenna element via a signal path that lacks additional amplification.

13. The antenna system of claim 1, wherein the amplifier is coupled with the first antenna element via an ohmic signal path.

14. A method for wireless communications, comprising:
transmitting, at a first antenna element of an antenna array, a calibration signal that comprises a first signal having a first frequency and that is modulated by a second signal having a second frequency;
receiving the calibration signal at a second antenna element of the antenna array;
analyzing a sideband of the received calibration signal, wherein the sideband has a third frequency that is offset from the first frequency by the second frequency;
determining, based at least in part on analyzing the sideband, a path loss for a signal path that includes mutual coupling between the first antenna element of the antenna array and the second antenna element of the antenna array; and
calibrating a system that includes the antenna array based at least in part on the determined path loss.

15. The method of claim 14, further comprising:
introducing the first signal at a first point of a transmit chain for the first antenna element; and
introducing the second signal at a second point of the transmit chain for the first antenna element.

16. The method of claim 15, wherein the second point of the transmit chain is nearer the first antenna element than the first point of the transmit chain.

17. The method of claim 15, wherein:
the first point of the transmit chain is coupled with the first antenna element via a first signal path; and
the second point of the transmit chain is coupled with the first antenna element via a second signal path that is a subset of the first signal path.

18. The method of claim 15, wherein introducing the second signal at the second point of the transmit chain comprises:
introducing the second signal via an amplifier included in the transmit chain.

19. The method of claim 18, wherein introducing the second signal via the amplifier comprises:
modulating a supply voltage of the amplifier based at least in part on the second signal.

20. The method of claim 18, wherein the amplifier is a power amplifier that is coupled with the first antenna element via a signal path that lacks additional power amplification.

21. The method of claim 18, wherein the amplifier is coupled with the first antenna element via an ohmic signal path.

22. The method of claim 14, further comprising:
analyzing a second sideband of the received calibration signal, wherein the second sideband has a fourth frequency, wherein the first frequency is between the third frequency and the fourth frequency, and wherein determining the path loss is based at least in part on analyzing the second sideband.

23. The method of claim 22, wherein the fourth frequency is offset from the first frequency by the second frequency.

24. The method of claim 14, further comprising:
modulating at least one of an amplitude, phase, or frequency of the second signal.

25. The method of claim 14, wherein analyzing the sideband comprises:
determining an amplitude of the received calibration signal at the third frequency.

26. The method of claim 14, wherein analyzing the sideband comprises:
determining a phase of the received calibration signal at the third frequency.

27. The method of claim 14, wherein calibrating the system that includes the antenna array comprises:
calibrating at least one of a first phase shifter coupled with the first antenna element or a second phase shifter coupled with the second antenna element.

28. An apparatus for wireless communications, comprising:
a processor;
memory in electronic communication with the processor; and
instructions stored in the memory and executable by the processor to cause the apparatus to:
transmit, at a first antenna element of an antenna array, a calibration signal that comprises a first signal having a first frequency and that is modulated by a second signal having a second frequency;
receive the calibration signal at a second antenna element of the antenna array;
analyze a sideband of the received calibration signal, wherein the sideband has a third frequency that is offset from the first frequency by the second frequency;
determine, based at least in part on analyzing the sideband, a path loss for a signal path that includes mutual coupling between the first antenna element of the antenna array and the second antenna element of the antenna array; and
calibrate a system that includes the antenna array based at least in part on the determined path loss.

29. An apparatus for wireless communications, comprising:
means for transmitting, at a first antenna element of an antenna array, a calibration signal that comprises a first signal having a first frequency and that is modulated by a second signal having a second frequency;
means for receiving the calibration signal at a second antenna element of the antenna array;
means for analyzing a sideband of the received calibration signal, wherein the sideband has a third frequency that is offset from the first frequency by the second frequency;
means for determining, based at least in part on analyzing the sideband, a path loss for a signal path that includes mutual coupling between the first antenna element of the antenna array and the second antenna element of the antenna array; and
means for calibrating a system that includes the antenna array based at least in part on the determined path loss.

* * * * *